United States Patent Office 3,364,012
Patented Jan. 16, 1968

3,364,012
DETECTING THE LEVEL OF CHARGE IN BLAST FURNACES
Yvon-Pol Noel, Pery-Trooz, Belgium, assignor to Centre National de Recherches Metallurgiques, Brussels, Belgium, a Belgian company
Filed Mar. 30, 1965, Ser. No. 443,858
Claims priority, application Belgium, Apr. 2, 1964, 646,066
8 Claims. (Cl. 75—41)

ABSTRACT OF THE DISCLOSURE

A method of detecting the level of the charge in a blast furnace using a telemeter with two objectives, where the distance of a point on the surface of the charge from the telemeter is measured by bringing two images of the point into coincidence at the eyepiece. The method may be used successively over a plurality of points to determine the contour of the charge surface.

---

The present invention relates to a process for the determination of charge level in blast furnaces.

Many attempts have been made to devise means for determining the level of charge in blast furnaces but they have not been found to be precise or else are difficult to put into practice.

One object of the present invention is to provide a process for the determination of a fluctuating charge level in a blast furnace making use of one or more optical telemeters.

By optical telemeters it is understood that both rangefinders working with visible light and with infra-red radiation are included.

One form of telemeter that has been found to be particularly suitable for use in the present invention is the type in which two images of a point on the charge, received by two objectives of the instrument, are brought into coincidence at the eyepiece. This can be used in ranging a luminous point on the charge. When a light is shone on to the charge the distance of the point of the charge illuminated can be found by sighting on the point and then deriving the distance from the angle of the sighting arrangement alone, since the angle of the illuminating device will be known. Such a source of illumination is preferred when the whole of the top of the charge in the blast furnace is itself luminous to a certain degree but not so bright as to prevent the projected light from showing up on it.

If one or more telemeters fixed in position are used it is possible to detect the movements of the level of the charge at one or more points. However, the upper surface of the charge in a blast furnace is fairly irregular so that it is necessary to range on a large number of points before the profile of the charge can be determined with precision.

In accordance with a feature of the invention it has been found advantageous that the telemeter or telemeters are directed on to various points on the surface of the charge in accordance with a systematic programmed exploration.

Using such a systematic exploration it is possible to register the level of the charge at each particular point on the surface of the charge so that the profile of the charge can be determined and, if necessary, its average can be recorded by taking the mean of the various levels. It is also possible to calculate the mean level of certain particular points of the charge in such a manner as to obtain several level curves which have been found to be particularly important.

For the purpose of correcting for absorption of light by the gases and dust which may be circulating above the charge, it is possible to use instead of light, infra-red radiation.

Also in accordance with the invention it is advantageous to emit visible light or infra-red radiation which is periodically modulated for the purpose of enabling a distinction to be made between light or infra-red radiation originating from the charge itself and radiation projected on to the charge.

With the aim of protecting the telemeter it has been found advantageous to cool the telemeter by circulating cooling fluid, for instance water or air under pressure.

In accordance with another advantageous feature of the invention intended to protect the telemeters from the atmosphere inside the blast furnace, the devices can be placed behind windows or port-holes themselves protected by appropriate means, for example jets of air, water cooling or windscreen wipers ensuring that the transparency of the windows or port-holes is not affected.

Again in accordance with the invention it is advantageous to record in an appropriate manner the ranges of different points of the charge.

It is also advantageous to provide for a connection between the recording apparatus and the charging apparatus of the blast furnace so that an automatic control of the level of charge and of the profile of the charge can be provided for.

A non-limiting practical embodiment of the present invention is now described with reference to the attached diagrammatic drawing.

Figure 1:
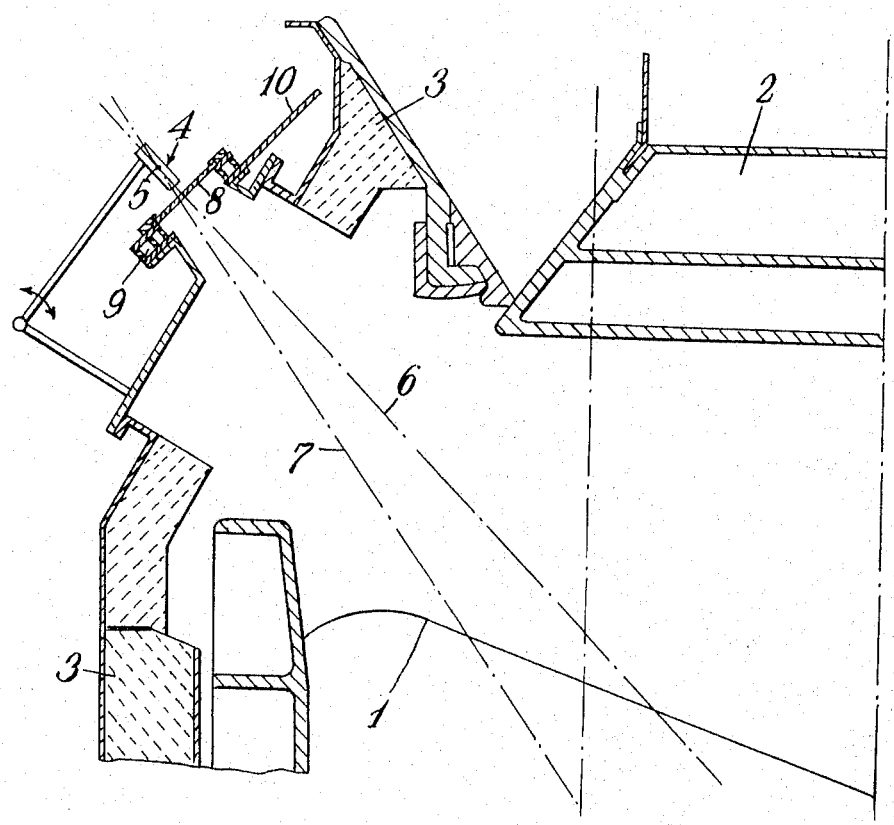
FIGURE 1 is a vertical radial section through the top part of a blast furnace including part of the cone or bell.

As shown in FIGURE 1 the top surface of the charge in the blast furnace is indicated by 1 while reference numeral 2 indicates the bell or cone of the furnace and 3 indicates the vertical wall. The telemeter is indicated by general reference numeral 4. It can be directed by swinging it about a horizontal axis 5 perpendicular to tne plane of the drawing. In the course of such a swinging movement the lines of sight can be moved between 6 and 7. Reference numeral 8 indicates a port-hole to protect the telemeter from gases inside the blast furnace while 9 indicates a cooling device and 10, an opaque sliding shutter shown in its open position.

Figure 2:
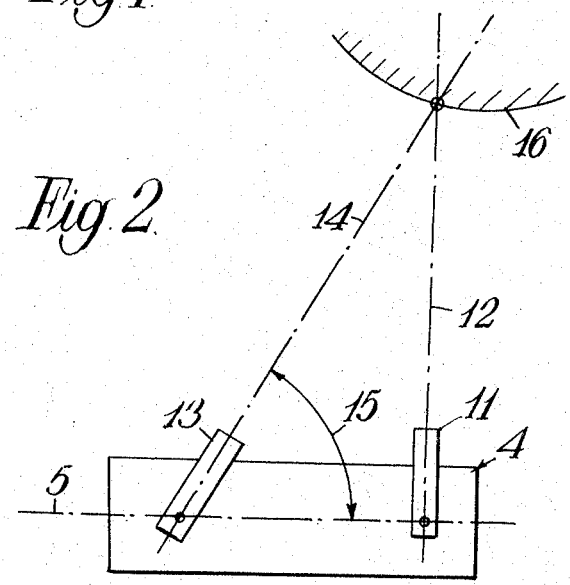
FIGURE 2 is a diagrammatic sketch showing the principle of ranging in accordance with the invention.

In FIGURE 2 reference numeral 11 indicates a fixed eyepiece having an optic axis 12 while 13 indicates a further eyepiece which can be swung about a fixed point so that its optic axis 14 makes various angles such as 15 with the optic axis 12 of the eyepiece 11.

The telemeter functions in a well-known fashion, that is to say the two images observed through eyepieces 11 and 13 are brought into coincidence so that the distance of the charge 16 from the eyepiece 11 may be derived from the angle 15. By making the whole telemeter 4 swing about the horizontal axis 5 and repeating the ranging operation just described for various angles of inclination of the axes 12 and 14 the profile of the charge can be easily determined.

While I have described one specific embodiment of my invention only, it is to be understood that I do not limit myself to this particular description and that the scope of protection I claim in the United States is to be defined by the spirit and gist of the following patent claims.

I claim:

1. In a method of detecting the charge level in a blast furnace by optical means, said method having the improvement that an optical telemeter with two objectives is directed onto a point on the charge surface, and the distance of said point from the telemeter is measured by bringing the two images of said point into coincidence at the eyepiece by relative angular adjustment of optical axes of the objectives.

2. A method as claimed in claim 1, in which the optical telemeter is directed successively onto a plurality of points on the charge surface according to a systematic program of exploration, and the measurement is repeated at said points.

3. A method as claimed in claim 2, wherein visible light is directed at the points onto which the telemeter is directed.

4. A method as claimed in claim 3, in which the light is modulated.

5. A method as claimed in claim 2, wherein infra-red radiation is directed at the points onto which the telemeter is directed.

6. A method as claimed in claim 5, in which the radiation is modulated.

7. A method as claimed in claim 1, wherein an indication of the charge level and the number of points is obtained by directing a separate optical telemeter at each of said number of points and measuring the distance of said points from the individual telemeters.

8. A method as claimed in claim 7, in which each optical telemeter is directed successively onto a plurality of points on the charge surface according to a systematic program of exploration, and the measurement is repeated at said plurality of points.

References Cited
UNITED STATES PATENTS

| | | | |
|---|---|---|---|
| 1,699,558 | 1/1929 | Ainsworth et al. | 33—70 |
| 1,706,857 | 3/1929 | Mathe | 73—293 X |
| 1,991,192 | 2/1935 | Bucky | 73—290 |
| 2,566,789 | 9/1951 | Blackinton et al. | 73—293 X |
| 2,873,714 | 2/1959 | Bauerlein | 73—293 X |

DAVID L. RECK, *Primary Examiner.*

HYLAND BIZOT, *Examiner.*

H. W. TARRING, *Assistant Examiner.*